(12) United States Patent
Yano et al.

(10) Patent No.: US 8,848,665 B2
(45) Date of Patent: Sep. 30, 2014

(54) NETWORK SYSTEM INCLUDING RADIO NETWORK USING MPLS

(75) Inventors: Masashi Yano, Kawasaski (JP); Nodoka Mimura, Kunitachi (JP); Masahiro Takatori, Yokohama (JP); Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 336 days.

(21) Appl. No.: 13/327,402

(22) Filed: Dec. 15, 2011

(65) Prior Publication Data

US 2012/0177004 A1 Jul. 12, 2012

(30) Foreign Application Priority Data

Jan. 7, 2011 (JP) .................. 2011-002018

(51) Int. Cl.
| | |
|---|---|
| H04W 40/00 | (2009.01) |
| H04W 40/36 | (2009.01) |
| H04L 12/723 | (2013.01) |
| H04L 12/911 | (2013.01) |
| H04W 88/08 | (2009.01) |
| H04W 76/02 | (2009.01) |
| H04W 88/16 | (2009.01) |
| H04W 36/00 | (2009.01) |
| H04W 88/02 | (2009.01) |

(52) U.S. Cl.
CPC .............. *H04L 45/50* (2013.01); *H04W 88/08* (2013.01); *H04L 45/507* (2013.01); *H04L 47/825* (2013.01); *H04L 47/824* (2013.01); *H04W 76/02* (2013.01); *H04W 88/16* (2013.01); *H04W 36/00* (2013.01); *H04W 88/02* (2013.01)
USPC ....................................... 370/331

(58) Field of Classification Search
CPC ............................. H04W 80/04; H04W 84/12
USPC .................... 370/331, 338; 709/249
See application file for complete search history.

(56) References Cited

U.S. PATENT DOCUMENTS

2004/0117508 A1  6/2004  Shimizu
2008/0117884 A1*  5/2008  Ishii et al. .................. 370/338
(Continued)

FOREIGN PATENT DOCUMENTS

| EP | 1 653 675 A1 | 5/2006 |
|---|---|---|
| JP | 2008-518532 A | 5/2008 |

OTHER PUBLICATIONS

3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8), 3GPP TS 29.274 V8.0.0 (Dec. 2008), pp. 1-111 (fifty-six (56) sheets).

(Continued)

*Primary Examiner* — Habte Mered
(74) *Attorney, Agent, or Firm* — Crowell & Moring LLP

(57) ABSTRACT

After a first base station connects to a first mobile terminal, a first GW (gateway) receives a request for connection between the first mobile terminal and a second GW and identifiers of the second GW and the first mobile terminal and transmits identifiers of the first mobile terminal and the first GW to the second GW. The second GW transmits an MPLS allocation flag to the first GW. The first GW transmits an MPLS allocation signal including an identifier of the first mobile terminal to the second GW via a second NW (network) apparatus. The first base station receives an identifier of the first GW and the MPLS allocation flag from the first GW via a management server and transmits the MPLS allocation signal including the identifier of the first mobile terminal to the first GW via a first NW apparatus.

6 Claims, 9 Drawing Sheets

(56) References Cited

U.S. PATENT DOCUMENTS

| | | | |
|---|---|---|---|
| 2011/0103310 A1* | 5/2011 | Stojanovski et al. | 370/328 |
| 2012/0147824 A1* | 6/2012 | Van der Merwe et al. | 370/329 |
| 2013/0064158 A1* | 3/2013 | Sundell et al. | 370/311 |
| 2013/0223399 A1* | 8/2013 | Lu et al. | 370/329 |

OTHER PUBLICATIONS

Gundavelli, et al., "IETF RFC 5213: Proxy Mobile IPv6", Aug. 2008, pp. 1-92 (forty-six (46) sheets).

Ren et al., "Integration of Mobile IP and Multi-Protocol Label Switching", ICC 2001, Jun. 2001, pp. 2123-2127 (three (3) sheets).

European Search Report dated May 2, 2012 (six (6) pages).

* cited by examiner

| INPUT PORT 701 | INPUT LABEL 702 | FEC TYPE 703 | FEC 704 | OUTPUT PORT 705 | OUTPUT LABEL 706 |
|---|---|---|---|---|---|
| 1 | 120 | UE S1 APID | 2245644123 | 5 | 510 |
|   |   | Bearer ID | 1 |   |   |
| 1 | 110 | UE S1 APID | 2245644177 | 3 | 610 |
|   |   | Bearer ID | 1 |   |   |
| 5 | 610 | UE S1 APID | 2245644123 | 1 | 220 |
|   |   | Bearer ID | 5 |   |   |
| 3 | 710 | UE S1 APID | 2245644177 | 1 | 210 |
|   |   | Bearer ID | 3 |   |   |
| ⋮ | ⋮ | ⋮ | ⋮ | ⋮ | ⋮ |

NETWORK SYSTEM INCLUDING RADIO NETWORK USING MPLS

CLAIM OF PRIORITY

The present application claims priority from Japanese patent application JP 2011-002018 filed on Jan. 7, 2011, the content of which is hereby incorporated by reference into this application.

FIELD OF THE INVENTION

The present invention relates to a network system and more particularly to a network system including a radio network using MPLS.

BACKGROUND OF THE INVENTION

A radio access network accommodates a base station and a mobile gateway using the UMTS (Universal Mobile Telecommunications System) technology and the EV-DO (Evolution Data Only) technology referred to as 3.5G. The radio access network generally provides an IP tunnel between the base station and the mobile gateway according to the IP tunnel link technology. User data is transmitted through the IP tunnel.

Widely known technologies for providing the IP tunnel include GTP (GPRS Tunnelling Protocol) specified in 3GPP (3rd Generation Partnership Project) and PMIP (Proxy Mobile IP) specified in IETF (Internet Engineering Task Force), for example. The IP tunnel is provided between the base station and the mobile gateway or between a first mobile gateway connected to a mobile access network and a second mobile gateway included in a service network. The IP tunnel is used for mobility management of terminals.

An ordinary IP network routes IP packets in units of subnetworks to which an IP address assigned to a terminal belongs. Accordingly, the terminal cannot move out of the subnetwork without changing the IP address assigned to the terminal. An IP tunnel technology represented by Mobile IP solves this problem.

The IP tunnel technology such as Mobile IP distributes a Care of Address (CoA) to the network. The Care of Address provides an IP address that differs from the IP address assigned to the mobile terminal and indicates an IP address corresponding to the current position of the mobile terminal. The IP tunnel technology encapsulates an IP packet for communication with the mobile terminal by providing the IP packet with an IP header whose destination address stores the Care of Address. The encapsulated IP packet is transferred to the mobile terminal at the destination in order to ensure the terminal mobility.

For this reason, the IP tunnel is mainly used for mobility control over radio access networks at the present time (e.g., refer to "TS 29.274, 3GPP Evolved Packet System (EPS); Evolved General Packet Radio Service (GPRS) Tunnelling Protocol for Control plane (GTPv2-C); Stage 3" and "IETF RFC 5213: Proxy Mobile IPv6").

On the other hand, communication speeds proceed to increase for the radio technology used for mobile terminals and base stations. The LTE/SAE system provides a communication speed of 100 Mbps. The LTE-Advanced system, expected to be a next-generation LTE/SAE radio system, will provide a communication speed over 100 Mbps.

To respond to increasing communication speeds, the radio access network (RAN) is requested to not only provide faster IP packet transfer but also apply the MPLS (Multi Protocol Labeling Switch) technology to the radio access network and replace the IP tunnel with an MPLS path. This is because the MPLS can ensure QoS for IP packets.

There is proposed a technology of replacing a Mobile IP tunnel with an MPLS tunnel (e.g., refer to Integration of Mobile IP and Multi-Protocol Label Switching ICC 2001, June 2001). Further, there is proposed a technology of providing the MPLS path from an exit node to an entry node when the mobile terminal is connected to the base station (e.g., refer to Japanese Unexamined Patent Application Publication (Translation of PCT Application) No. 2008-518532).

However, the MPLS path is installed when an LSR (Label Switch Router) between nodes maintains label switch information hop by hop. The path configuration requires updating the label switch information maintained in all LSRs to be traveled. Generally, the radio access network accommodates as many as over 1,000,000 mobile terminals. A label resource in the MPLS network might be greatly consumed and the MPLS network performance might degrade if all the mobile terminals are supplied with independent label switch paths.

SUMMARY OF THE INVENTION

Many label switch paths are needed if a radio access network uses the MPLS for each mobile terminal or bearer in order to accelerate the network. The use of the MPLS for the radio access network generally degrades the network performance compared to an MPLS network in VPN.

All LSRs placed between the base station and gateways might be switched if a hand-over is performed between the mobile terminal and the base station. A process is needed for the hop-by-hop LSR, thus extending the time to complete the hand-over.

It is therefore an object of the present invention to decrease network performance degradation due to distribution of MPLS labels, fast complete hand-over by fast switching an LSR between the base station and the gateway, and provide a highly efficient mobile MPLS network.

The following describes a representative example of the present invention. A network system includes: plural mobile terminals; plural base stations connected to the mobile terminals by radio; a first gateway connected to the base stations via plural first network apparatuses; a second gateway connected to the first gateway via plural second network apparatuses; and a management server connected to the base stations and the first gateway. A first of the mobile terminals is connected to a first of the base stations and the first base station transmits a request for connection with the first mobile terminal to the management server. The first gateway thereafter receives a first signal from the management server, the first signal being configured to include a request for connection between the first mobile terminal and the second gateway, an identifier of the second gateway, and an identifier of the first mobile terminal. The first gateway transmits a second signal to a destination specified by the identifier of the second gateway included in the first signal, the second signal being configured to include the identifier of the first mobile terminal included in the first signal and an identifier of the first gateway. The second gateway transmits a third signal to a destination specified by the identifier of the first gateway included in the second signal, the third signal being configured to include the identifier of the second gateway and an MPLS allocation flag indicating allocation of an MPLS path to a route between the first mobile terminal and the second gateway. Based on the MPLS allocation flag included in the third signal, the first gateway transmits a fourth signal for MPLS path allocation to a destination specified by the second gateway included in the third signal via the second network apparatuses, the fourth signal being configured to include the identifier of the first mobile terminal. The first base station receives a fifth signal from the first gateway via the management server, the fifth signal being configured to include the identifier of the first gateway and the MPLS allocation flag. Based on the MPLS allocation flag included in the fifth signal, the first base station transmits a sixth signal for MPLS path allocation to a destination specified by the identifier of the first gateway included in the fifth signal via the first network apparatuses, the sixth signal being configured to include the identifier of the first mobile terminal. After the first mobile terminal is connected to the second base station, the second base station transmits a seventh signal for MPLS allocation to plural third network apparatuses provided to a route for communication between the second base station and the first gateway, the seventh signal being configured to include the identifier of the first mobile terminal.

An embodiment of the present invention can prevent the network performance from degrading without distributing many MPLS labels.

DETAILED DESCRIPTION OF THE PREFERRED EMBODIMENTS

Figure 1:
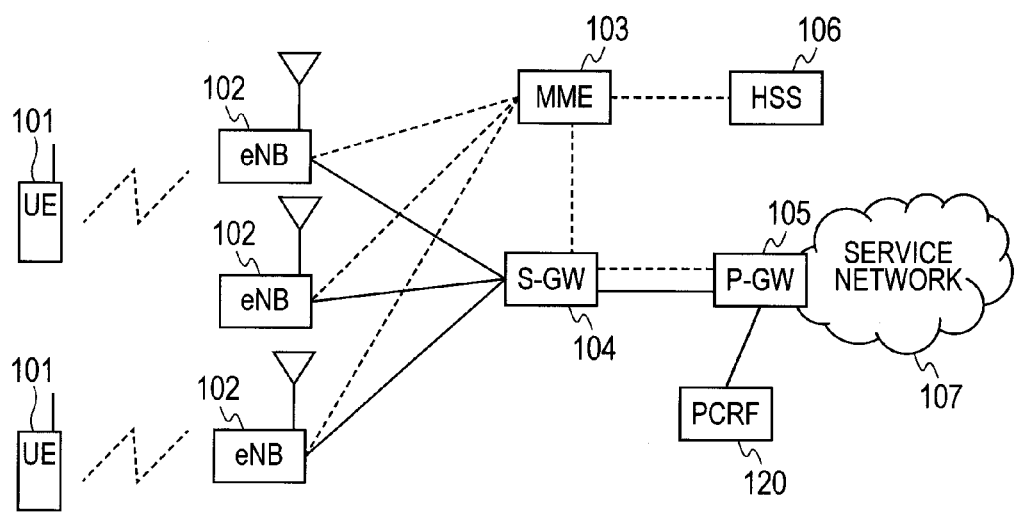
FIG. 1 is a block diagram showing a basic radio network according to a first embodiment of the invention.
Figure 2:
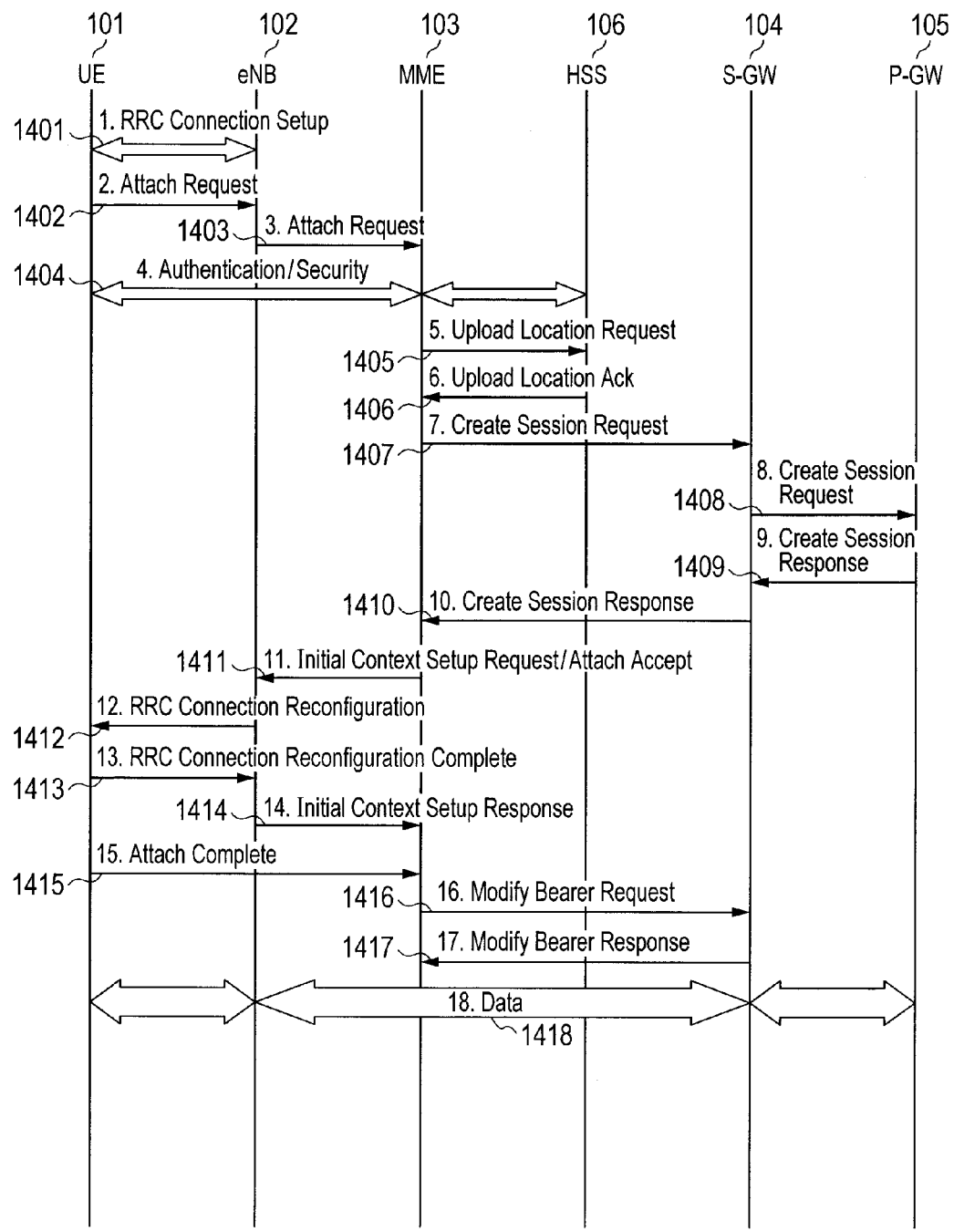
FIG. 2 is a sequence diagram showing a basic communication process using an IP tunnel for the radio network according to the first embodiment of the invention.
Figure 3:
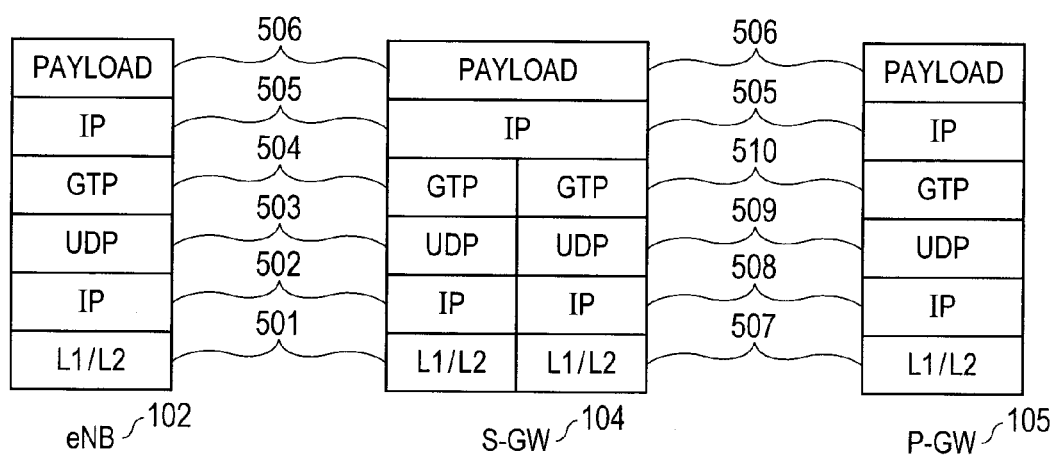
FIG. 3 is an explanatory diagram showing basic protocol stacks for eNB, S-GW, and P-GW to be used with GTP tunnels according to the first embodiment of the invention.

FIGS. 1, 2, and 3 show basic processes that provide a radio network with IP tunnels.

FIG. 1 is a block diagram showing a basic radio network according to a first embodiment of the invention.

The radio network shown in FIG. 1 is called LTE/SAE (Long Term Evolution/System Architecture Evolution) and is equivalent to the radio access network specified in 3GPP. The radio network shown in FIG. 1 includes UE 101, eNB 102, MME 103, S-GW 104, P-GW 105, PCRF 120, and a service network 107.

The UE 101 is a mobile terminal. The eNB (enhanced Node B) 102 is a base station. The MME (Mobility Management Entity) 103 is a mobility management server that performs position management and authentication processes for the UE 101. The UE 101 communicates with the eNB 102 by radio.

The S-GW (Serving GW) 104 is a first mobile gateway functioning as an anchor point in the radio access network. The P-GW (Packet Data Network GW) 105 is a second mobile gateway functioning as an entry to the service network.

An HSS 106 (Home Subscriber Server) is a subscriber data server that distributes data and/or user profiles for authenticating the UE 101 to the MME 103 or performs position management.

A PCRF (Policy and Charging Enforcement Function) 120 is a server that manages a user profile for each user of the UE 101 and provides a QoS policy control function and/or a charging function. The user of the UE 101 signifies a user associated with each UE 101 or bearer.

The service network 107 is equivalent to a core network that provides the UE 101 with a mail service and/or a web access service.

FIG. 2 is a sequence diagram showing a basic communication process using an IP tunnel for the radio network according to the first embodiment of the invention.

The sequence diagram in FIG. 2 shows an example process of setting an IP tunnel for transferring user data when the UE 101 connects with the service network 107 in the radio network shown in FIG. 1.

The UE 101 issues a request to connect with the service network 107 and establishes a radio link with the eNB 102 (1401). The UE 101 transmits a connection request message to the MME 103 via the eNB 102 (1402 and 1403).

The MME 103 receives the connection request message from the UE 101 and acquires authentication data corresponding to the UE 101 as a sender of the connection request message and data about an encryption key used by the UE 101 from the HSS 106. The MME 103 authenticates the UE 101 based on the acquired data (1404).

The MME 103 registers the position of the UE 101 to the HSS 106 if the authentication at sequence 1404 is successful (1405). The MME 103 acquires profile information about a subscriber stored in the HSS 106 from it. The MME 103 thereby acquires information indicating the service network 107 as a connection destination of the UE 101 and information indicating the P-GW 105 as a connection destination included in the service network 107 (1406).

Based on the acquired information indicating the P-GW 105, the MME 103 requests the S-GW 104 to make connection with the P-GW 105 and the UE 101 as connection points to the service network 107 (1407). At sequence 1407, the MME 103 transmits an identifier for uniquely identifying the UE 101 or the bearer to the S-GW 104.

When receiving the connection request from the MME 103, the S-GW 104 transmits a session establishment request to the P-GW 105 based on connection information (including the information indicating the P-GW 105) contained in the received connection request (1408). The session establishment request at sequence 1408 contains information indicating a GTP tunnel that transmits a packet addressed to the UE 101 from the P-GW 105 to the S-GW 104.

The information indicating the GTP tunnel, to be transmitted to the P-GW 105 at sequence 1408, contains an endpoint IP address of the GTP tunnel, that is, a reception IP address for the S-GW 104 and a TEID (Tunnel Endpoint Identifier). The TEID uniquely identifies the GTP tunnel. The session establishment request at sequence 1408 contains the TEID that uniquely indicates the GTP tunnel provided for a transmission path from the P-GW 105 to the S-GW 104.

The GTP tunnel is unique for each UE 101 or bearer. The TEID is also unique for each UE 101 or bearer.

The P-GW 105 receives the session establishment request from the S-GW 104 and then transmits a session establishment response to the S-GW 104 that transmitted the session establishment request (1409). The session establishment response at sequence 1409 contains information indicating a GTP tunnel used to transmit the packet transmitted from the UE 101 to the service network 107 via the S-GW 104 and the P-GW 105 in succession.

The information indicating the GTP tunnel, to be transmitted to the S-GW 104 at sequence 1409, contains an endpoint IP address of the GTP tunnel, that is, an IP address of the P-GW 105 and the TEID for identifying the GTP tunnel. The TEID contained in the session establishment response at sequence 1409 contains another TEID that uniquely indicates a GTP tunnel used to transmit a packet from the S-GW 104 to the P-GW 105.

The S-GW 104 receives the session establishment response from the P-GW 105 and then transmits a session establishment response to the MME 103 (1410). The session establishment response at sequence 1410 contains information indicating a GTP tunnel used to transmit the packet transmitted from the UE 101 further from the eNB 102 to the service network 107 via the S-GW 104 and the P-GW 105. The information indicating the GTP tunnel at sequence 1410 contains an endpoint IP address of the GTP tunnel, that is, an IP address of the S-GW 104 and the TEID that uniquely identifies a GTP tunnel for transmitting a packet from the eNB 102 to the S-GW 104.

The MME 103 receives the session establishment response from the S-GW 104 and then transmits an Initial Context Setup/Attach Accept message to the eNB 102 in order to notify the eNB 102 and the UE 101 that connection between the eNB 102 and the P-GW 105 is ready to be established (1411).

The message transmitted to the eNB 102 at sequence 1411 contains information indicating the GTP tunnel notified from the S-GW 104 at sequence 1410. That is, the message contains the IP address of the S-GW 104 and the TEID that uniquely indicates the GTP tunnel for transmitting a packet from the eNB 102 to the S-GW 104.

The eNB 102 receives the Initial Context Setup/Attach Accept message from the MME 103 and then reestablishes the radio link connection with the UE 101 (1412 and 1413). The eNB 102 then transmits an Initial Context Setup Response to the MME 103 (1414).

The message transmitted at sequence 1414 contains information indicating a GTP tunnel used to transfer a packet addressed to the UE 101 from the S-GW 104 to the eNB 102. Specifically, the information indicating the GTP tunnel at sequence 1414 contains an endpoint IP address of the GTP tunnel, that is, an IP address of the eNB 102 and the TEID that uniquely identifies a GTP tunnel for transmitting a packet from the S-GW 104 to the eNB 102.

The UE 101 further transmits an Attach Accept message to the MME 103 and thereby notifies the MME 103 that the connection with the service network 107 has been established (1415).

The MME 103 issues a Modify Bearer Request message to transmit the information indicating the GTP tunnel transmitted from the eNB 102 at sequence 1414 to the S-GW 104 (1416). The S-GW 104 receives the Modify Bearer Request message from the MME 103 and then issues a Modify Bearer Response message to respond to the MME 103 (1417).

The above-mentioned procedure establishes the GTP tunnel between the eNB 102 and the S-GW 104 and the GTP tunnel (1418) between the S-GW 104 and the P-GW 105. The packet addressed to the UE 101 from the service network 107 is transmitted to the UE 101 via the P-GW 105, the S-GW 104, and the eNB 102. The packet addressed to the service network 107 from the UE 101 is transmitted to the service network 107 via the eNB 102, the S-GW 104, and the P-GW 105.

FIG. 3 is an explanatory diagram showing basic protocol stacks for the eNB 102, the S-GW 104, and the P-GW 105 to be used with GTP tunnels according to the first embodiment of the invention.

FIG. 3 shows protocol stacks used for the radio network shown in FIG. 1. The protocol stacks for the eNB 102, the S-GW 104, and the P-GW 105 contain an IP 505 and a payload 506 in common. The protocol stacks for the eNB 102 and the S-GW 104 contain L1/L2 (501), IP 502, UDP 503, and GTP 504 because the eNB 102 and the S-GW 104 communicate with each other. The protocol stacks for the S-GW 104 and the P-GW 105 contain L1/L2 (507), IP 508, UDP 509, and GTP 510 because the S-GW 104 and the P-GW 105 communicate with each other.

Each protocol stack shown in FIG. 3 is equivalent to the header attached to a packet to be transmitted or received in the radio network.

The payload 506 is equivalent to a payload attached to a packet.

The IP 505 is equivalent to an IP header. The eNB 102, the S-GW 104, and the P-GW 105 transmit or receive a packet that contains the IP header for storing an IP address.

If a packet is addressed to the UE 101, the IP header attached to the packet stores the IP address allocated to the UE 101 as a reception destination IP address. If a packet is transmitted from the UE 101, the IP header stores the IP address allocated to the UE 101 as a transmission destination IP address.

L1/L2 (501) and L1/L2 (507) indicate the physical layer and the data link layer (Layer1/Layer2). The L1/L2 (501) is used between the eNB 102 and the S-GW 104. The L1/L2 (507) is used between the S-GW 104 and the P-GW 105.

The IP 502 is equivalent to an IP header in the GTP tunnel for packets transmitted and received between the eNB 102 and the S-GW 104. The IP 508 is equivalent to an IP header in the GTP tunnel for packets transmitted and received between the S-GW 104 and the P-GW 105.

The UDP 503 is equivalent to a UDP header in the GTP tunnel for packets transmitted and received between the eNB 102 and the S-GW 104. The UDP 509 is equivalent to a UDP header in the GTP tunnel for packets transmitted and received between the S-GW 104 and the P-GW 105.

The GTP 504 is equivalent to a GTP header indicating the GTP tunnel between the eNB 102 and the S-GW 104. The GTP 510 is equivalent to a GTP header indicating the GTP tunnel between the S-GW 104 and the P-GW 105. The GTP header contains the TEID that uniquely indicates each GTP tunnel.

Of packets received from the eNB 102, the S-GW 104 replaces the headers indicating the IP 502, the UDP 503, and the GTP 504 corresponding to the GTP tunnel between the eNB 102 and the S-GW 104 with the headers indicating the IP 508, the UDP 509, and the GTP 510 corresponding to the GTP tunnel between the S-GW 104 and the P-GW 105. The S-GW 104 transmits the packets having the replaced headers to the P-GW 105.

Of packets received from the P-GW 105, the S-GW 104 replaces the headers indicating the IP 508, the UDP 509, and the GTP 510 corresponding to the GTP tunnel between the S-GW 104 and the P-GW 105 with the headers indicating the IP 502, the UDP 503, and the GTP 504 corresponding to the GTP tunnel between the eNB 102 and the S-GW 104. The S-GW 104 transmits the packets having the replaced headers to the eNB 102.

The following describes a process of providing the above-mentioned GTP tunnel with an MPLS path.

Figure 4:
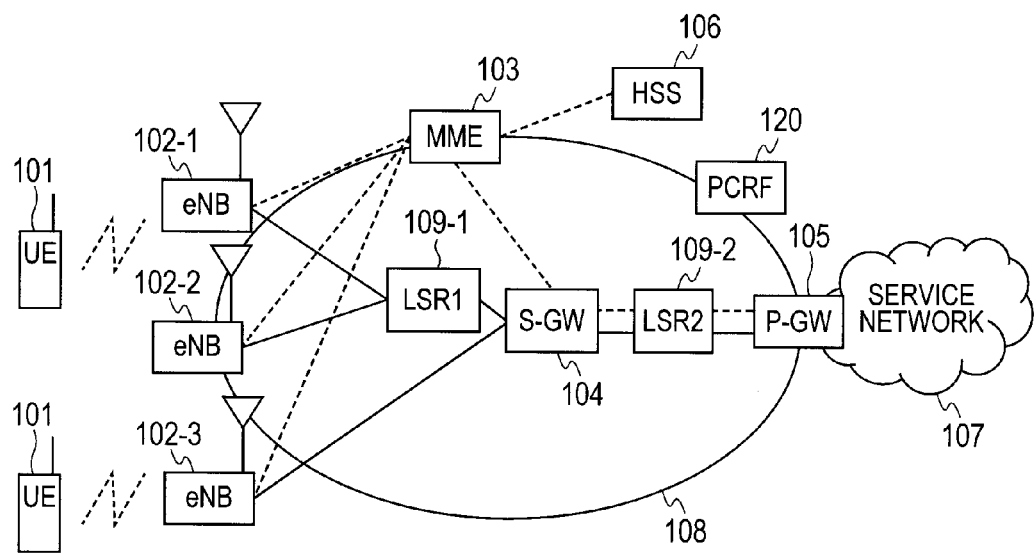
FIG. 4 is a block diagram showing a radio network according to the first embodiment of the invention.

FIG. 4 is a block diagram showing a radio network according to the first embodiment of the invention.

The radio network according to the embodiment includes the UE 101, the eNB 102 (102-1 through 102-3), the MME 103, the S-GW 104, the P-GW 105, the PCRF 120, the service network 107, a radio access network 108, LSR1 (109-1), and LSR2 (109-2). In the following description, the LSR1 (109-1) and the LSR2 (109-2) are generically referred to as LSR 109.

The UE 101 is a mobile terminal. The eNB (enhanced Node B) 102 is a base station. The MME (Mobility Management Entity) 103 is a mobility management server that performs position management and authentication processes for the UE 101. The UE 101 communicates with the eNB 102 by radio.

The S-GW (Serving GW) 104 is a first mobile gateway functioning as an anchor point in the radio access network. The P-GW (Packet Data Network GW) 105 is a second mobile gateway functioning as an entry to the service network.

The PCRF 120 is a server that manages a user profile for each user using the UE 101 and provides the QoS policy control function and/or the charging function.

The HSS 106 (Home Subscriber Server) is a subscriber data server that distributes data and/or user profiles for authenticating the UE 101 to the MME 103 or performs position management. The service network 107 is equivalent to a core network that provides the UE 101 with a mail service and/or a web access service.

The radio access network 108 is provided between the eNB 102 and the P-GW 105. The LSR 109 is a router node for packet transfer and provides the LSR (Label Switching Router) function for MPLS.

The UE 101, the eNB 102 (102-1 through 102-3), the MME 103, the S-GW 104, the P-GW 105, the PCRF 120, the service network 107, the LSR1 (109-1), and the LSR2 (109-2) are computers each having a processor. The processor performs a program loaded into the memory to implement the corresponding function.

Figure 5:
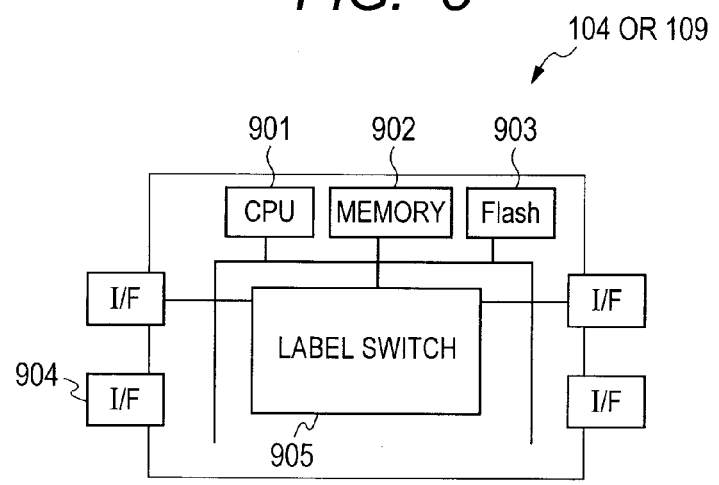
FIG. 5 is a block diagram showing a physical configuration of S-GW and LSR according to the first embodiment of the invention.

FIG. 5 is a block diagram showing a physical configuration of the S-GW 104 and the LSR 109 according to the first embodiment of the invention.

The S-GW 104 and the LSR 109 each include a CPU 901, memory 902, nonvolatile memory 903, an interface 904, and a label switch processing portion 905.

The CPU 901 includes at least one processor. The CPU 901 performs a program stored in the memory 902.

The memory 902 stores a program loaded from the nonvolatile memory 903. The CPU 901 accesses and performs the program stored in the memory 902. The memory 902 also stores MPLS FIB to be described later and IP tunnel information after the MPLS is applied.

The nonvolatile memory 903 is equivalent to flash memory, for example. The nonvolatile memory 903 stores programs performed by the CPU 901 and configuration information for performing programs.

The interface 904 is equivalent to a network interface for communication through a network in the radio access network 108. The interface 904 receives packets from the other apparatuses such as the eNB 102 and the LSR 109. The interface 904 stores a received packet in the memory 902 or transmits it to the label switch processing portion 905.

The label switch processing portion 905 processes a packet supplied with the MPLS header.

Figure 6:
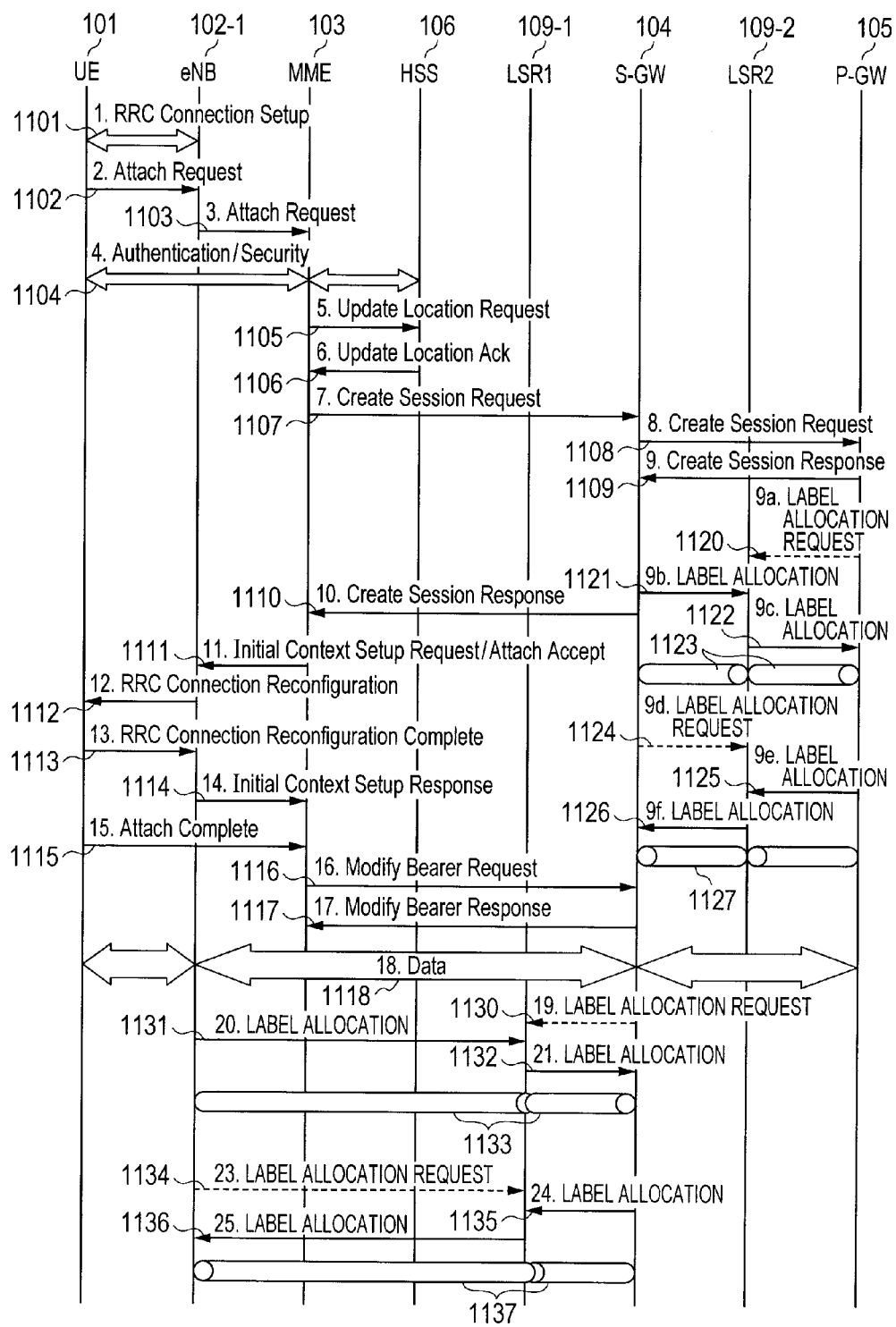
FIG. 6 is a sequence diagram showing an MPLS path allocation procedure according to the first embodiment of the invention.

FIG. 6 is a sequence diagram showing an MPLS path allocation procedure according to the first embodiment of the invention.

A process from sequences 1101 to 1107 in FIG. 6 is equal to that from sequences 1401 to 1407 in FIG. 2. The following description starts from sequence 1108.

The S-GW 104 receives the connection request from the MME 103 and then transmits a session establishment request to the P-GW 105 based on the information about connection to the service network 107 contained in the received connection request (1108). The session establishment request at sequence 1108 contains: information indicating a GTP tunnel used for transferring the packet addressed to the UE 101 from the P-GW 105 to the S-GW 104; and an identifier for the UE 101 or the bearer that requested the connection via the eNB 102-1 and the MME 103.

The information indicating the GTP tunnel, to be transmitted to the P-GW 105 at sequence 1108, contains an endpoint IP address of the GTP tunnel, that is, a reception IP address for the S-GW 104 and the TEID. The TEID contained in the session establishment request at sequence 1108 uniquely indicates a GTP tunnel provided between the S-GW 104 and the P-GW 105.

The embodiment applies MPLS paths to a network using GTP tunnels and therefore allocates fixed MPLS paths between apparatuses including the eNB 102-1, the S-GW 104, and the P-GW 105 functioning as endpoints of the GTP tunnels. The MPLS header replaces a header that stores information equivalent to the TEID for the GTP tunnel. Instead of the TEID, an MPLS label is distributed to each of the apparatuses including the eNB 102-1, the LSR 109, the S-GW 104, and the P-GW 105.

When receiving the MPLS header, the LSR 109 and the S-GW 104 can identify each tunnel between the apparatuses by stacking the distributed MPLS label onto the fixed MPLS path. The replacement with the MPLS header will be described with reference to an explanatory diagram showing protocol stacks to be described.

The P-GW 105 receives the session establishment request at sequence 1108 and then extracts the identifier for the UE 101 or the bearer contained in the session establishment request. The P-GW 105 determines the QoS policy specific to the UE 101 or the bearer based on the extracted identifier.

The P-GW 105 extracts the identifier indicating the UE 101 or the bearer from the transmitted session establishment request. Based on the extracted identifier, for example, the P-GW 105 acquires a user class (information indicating a user priority), QoS policy supplied to a user, and/or charging information allocated to the user from the PCRF 120. Based on the acquired information, the P-GW 105 settles the QoS policy corresponding to the UE 101 or the bearer. The user here is assumed to use the UE 101 or the bearer.

Alternatively, the P-GW 105 may settle the QoS policy corresponding to the UE 101 or the bearer based on static policy such as APN (Access Point Name) that is previously stored and is allocated to each service network, for example. In this case, the information such as APN used for the UE 101 may be contained in the session establishment request at sequence 1108 and may be transmitted to the P-GW 105 via the S-GW 104.

The QoS policy to be settled here ensures specified traffic in the daytime and provides best-effort traffic at night, for example.

Based on the settled QoS policy, the P-GW 105 settles the maximum bit rate and/or the guaranteed bandwidth allocated to each UE 101 or bearer. The P-GW 105 may allocate the maximum bit rate and/or the guaranteed bandwidth to the UE 101 or the bearer for upstream or downstream communication thereof.

The P-GW 105 compares the settled maximum bit rate and/or guaranteed bandwidth with a predetermined threshold value maintained in the P-GW 105. A comparison result might indicate that the settled maximum bit rate and/or guaranteed bandwidth is greater than the predetermined threshold value. In such a case, particularly high QoS is needed for the UE 101 or the bearer requested for connection. The P-GW 105 settles to allocate an MPLS path for the UE 101 or the bearer requested for communication or for upstream or downstream communication of the UE 101 or the bearer.

The information acquired from the PCRF 120 might indicate that a high priority is provided for the UE 101 or the bearer requested for connection. In such a case, the P-GW 105 may settle to allocate an MPLS path to the UE 101 or the bearer provided with a high priority.

An MPLS path may be allocated while a session is established or if the total amount of actual traffic after the session establishment exceeds a threshold value.

The P-GW 105 then transmits the session establishment response at sequence 1109 to the S-GW 104 to transmit, to the same, the result acquired after reception of the session establishment request at sequence 1108, that is, the information indicating whether to allocate an MPLS path between the S-GW 104 and the P-GW 105.

The session establishment response at sequence 1109 contains not only information indicating the GTP tunnel used for packets transmitted from the UE101 to the service network 107 via the S-GW104 and the P-GW105 in succession, but also a flag indicating allocation of an MPLS path for downstream communication of the UE 101 or the bearer requested for connection.

The P-GW 105 generates the flag indicating the MPLS path allocation corresponding to a route to which the MPLS path is allocated. That is, the flag indicating the MPLS path allocation contains another flag indicating the MPLS path allocation corresponding to the UE 101 or the bearer and still another flag indicating the MPLS path allocation corresponding to upstream or downstream communication of the UE 101 or the bearer.

The information indicating the GTP tunnel, to be transmitted to the P-GW 104 at sequence 1109, contains an endpoint IP address of the GTP tunnel, that is, an IP address for the P-GW 105 and the TEID for identifying the GTP tunnel from the S-GW 104 to the P-GW 105.

The session establishment response received from the P-GW 105 at sequence 1109 might contain the flag indicating the MPLS path allocation for downstream communication of the UE 101 or the bearer requested for connection. In this case, the S-GW 104 starts a procedure to establish the MPLS path for transmitting a packet to the S-GW 104 from the P-GW 105.

The MPLS establishment procedure according to the embodiment uses LDP (Label Distribution Protocol), CR-LDP (Constraint-Routing LDP), or RSVP (Resource Reservation Protocol)-TE, for example.

The S-GW 104 receives the session establishment response at sequence 1109 and then transmits a label allocation message to the LSR2 (109-2) so as to be transmitted to the P-GW 105 (1121). The S-GW 104 thereby distributes the MPLS label corresponding to the GTP tunnel for downstream communication allocated at sequence 1108 to the LSR2 (109-2) on the route corresponding to the GTP tunnel between the P-GW 105 and the S-GW 104.

The label allocation message at sequence 1121 is transmitted to the destination indicated by the identifier for the P-GW 105 contained in the session establishment response at sequence 1109. As a result, the label allocation message at sequence 1121 is transferred along the route corresponding to the GTP tunnel from the P-GW 105 to the S-GW 104. While FIG. 6 shows one LSR2 (109-2), the embodiment may use plural LSR2's (109-2).

The label allocation message at sequence 1121 contains the FEC (Forwarding Equivalence Class) information for MPLS in order to make correspondence between the MPLS path and the GTP tunnel. The FEC information contains the IP address of the S-GW 104 as an endpoint of the GTP tunnel and the TEID for identifying the GTP tunnel from the P-GW 105 to the S-GW 104.

The FEC information contained in the label allocation message at sequence 1121 may further contain: an identifier indicating the UE 101; an identifier indicating the APN; IP addresses of the P-GW 105 and the UE 101; or an identifier uniquely indicating the UE 101 or the bearer such as IMSI (International Mobile Subscriber Identity) or bearer ID.

The P-GW 105 may transmit a label allocation request message to the LSR2 (109-2) parallel to sequence 1121 in order to request the LSR2 (109-2) to allocate an MPLS path (1120). The P-GW 105 can fast allocate the MPLS path by transmitting the label allocation request message at sequence 1120.

The label allocation request message at sequence 1120 contains the FEC information similarly to the label allocation message at sequence 1121. The label allocation request message at sequence 1102 is transmitted to the destination indicated by the identifier for the S-GW 104 used at sequence 1109. As a result, the label allocation request message at sequence 1120 is transferred along the packet transfer route corresponding to the GTP tunnel from the P-GW 105 to the S-GW 104.

The LSR2 (109-2) is positioned along the route corresponding to the GTP tunnel from the P-GW 105 to the S-GW 104. The LSR2 (109-2) does not transfer the received label allocation request message to further LSR2 (109-2) or the S-GW 104 if the FEC contained in the received label allocation request message is already stored in the memory 902 or is equal to the FEC contained in the received label allocation message.

The LSR2 (109-2) transfers the label allocation message transmitted from the S-GW 104 at sequence 1121 and transmits it to the P-GW 105 (1122). As a result, the MPLS label containing the FEC information is distributed to the LSR2 (109-2) along the route corresponding to the GTP tunnel from the P-GW 105 to the S-GW 104 to establish a downstream MPLS path 1123 from the P-GW 105 to the S-GW 104.

After sequence 1108, the P-GW 105 might determine allocation of the MPLS path to upstream communication from the UE 101 or the bearer requested for connection. In this case, the P-GW 105 transmits the label allocation message to the LSR2 (109-2) so as to be addressed to the S-GW 104 (1125). As a result, the P-GW 105 distributes the MPLS label corresponding to the upstream GTP tunnel allocated at sequence 1109 to the LSR2 (109-2) along the route corresponding to the GTP tunnel between the P-GW 105 and the S-GW 104.

The label allocation message at sequence 1125 is transmitted to the destination indicated by the identifier for the S-GW 104 used at sequence 1109. As a result, the label allocation message at sequence 1125 is transferred along the route corresponding to the GTP tunnel from the S-GW 104 to the P-GW 105.

Similarly to sequence 1121, the label allocation message at sequence 1125 contains the FEC information for making correspondence between the MPLS path and the GTP tunnel. The FEC information contains the IP address of the P-GW 105 as an endpoint of the GTP tunnel and the TEID for identifying the GTP tunnel from the S-GW 104 to the P-GW 105.

The FEC information contained in the label allocation message at sequence 1125 may further contain: an identifier indicating the UE 101; an identifier indicating the APN; IP addresses of the P-GW 105 and the UE 101; or an identifier uniquely indicating the UE 101 or the bearer such as IMSI (International Mobile Subscriber Identity) or bearer ID.

The S-GW 104 may transmit a label allocation request message to the LSR2 (109-2) parallel to sequence 1125 in order to request the LSR2 (109-2) to allocate an MPLS path (1124). The S-GW 104 can fast allocate the MPLS path by transmitting the label allocation request message.

The label allocation request message at sequence 1124 contains the FEC information similarly to the label allocation message at sequence 1125. The label allocation request message at sequence 1124 is transmitted to the destination indicated by the identifier for the P-GW 105. As a result, the label allocation request message at sequence 1124 is transferred along the route corresponding to the GTP tunnel from the S-GW 104 to the P-GW 105.

The LSR2 (109-2) is positioned along the route corresponding to the GTP tunnel between the S-GW 104 and the P-GW 105. The LSR2 (109-2) does not transfer the received label allocation request message to further LSR2 (109-2) or the P-GW 105 if the FEC contained in the received label allocation request message is already stored in the memory 902 or is equal to the FEC contained in the received label allocation message.

The LSR2 (109-2), positioned along the route corresponding to the GTP tunnel from the S-GW 104 to the P-GW 105, transfers the label allocation message transmitted from the P-GW 105 at sequence 1125 and transmits it to the S-GW 104 (1126). As a result, the MPLS label containing the FEC information is distributed to the LSR2 (109-2) along the route corresponding to the GTP tunnel from the S-GW 104 to the P-GW 105 to establish an upstream MPLS path 1127 from the S-GW 104 to the P-GW 105.

The process from sequences 1110 to 1117 in FIG. 6 is equal to the process from sequences 1410 to 1417 in FIG. 2. Differences will be described below. The GTP tunnel 1118 equals the GTP tunnel 1418.

Information for MPLS path allocation is added to not only the session establishment response transmitted from the S-GW 104 to the MME 103 at sequence 1110, but also an Initial Context Setup Request message transmitted from the MME 103 to the eNB 102-1 at sequence 1111.

That is, the session establishment response at sequence 1110 and the Initial Context Setup Request message at sequence 1111 contain: the information indicating the GTP tunnel used to transmit a packet transmitted from the UE 101 from the eNB 102 to the service network 107 via the S-GW 104 and the P-GW 105; and a flag indicating allocation of an MPLS downstream communication path for the UE 101 or the bearer requested for connection.

The information indicating the GTP tunnel at sequences 1110 and 1111 contains an endpoint IP address of the GTP tunnel, that is, an IP address for the S-GW 104 and the TEID for identifying the GTP tunnel from the eNB 102 to the S-GW 104.

The Initial Context Setup Request message received from the MME 103 at sequence 1111 might contain the flag indicating the MPLS path allocation for downstream communication of the UE 101 or the bearer requested for connection. In this case, the eNB 102-1 starts a procedure to establish the MPLS path for transmitting a packet to the eNB 102-1 from the S-GW 104.

The eNB 102-1 receives the Initial Context Setup Request message at sequence 1111 and then transmits the label allocation message to the LSR1 (109-1) so as to be transmitted to the S-GW 104 (1131). As a result, the eNB 102-1 distributes the MPLS label corresponding to the downstream GTP tunnel allocated at sequence 1116 to the LSR1 (109-1) along the route corresponding to the GTP tunnel between the S-GW 104 and the eNB 102-1.

The label allocation message at sequence 1131 is transmitted to the destination indicated by the IP address for the S-GW 104 contained in the session establishment response at sequence 1111. As a result, the label allocation message at sequence 1131 is transferred along the route corresponding to the GTP tunnel from the S-GW 104 to the eNB 102-1. While FIG. 6 shows one LSR1 (109-1), the embodiment may use plural LSR1's (109-1).

The label allocation message at sequence 1131 contains MPLS FEC information for making correspondence between an MPLS path and a GTP tunnel. The FEC information contains an identifier (e.g., IP address) of the UE 101 allocated by the MME 103, an identifier (e.g., MAC address) specific to the UE 101, or a bearer ID, and a TEID for identifying the GTP tunnel from the S-GW 104 to the eNB 102-1.

The FEC information contained in the label allocation message at sequence 1131 may further contain: an identifier indicating the APN used for the UE 101 to communicate with the service network 107; or an identifier uniquely indicating the UE 101 or the bearer such as IP addresses of the P-GW 105 and the UE 101.

The S-GW 104 may transmit a label allocation request message to the LSR1 (109-1) parallel to sequence 1131 in order to request the LSR1 (109-1) to allocate an MPLS path (1130). The S-GW 104 can fast allocate the MPLS path by transmitting the label allocation request message at sequence 1120.

The label allocation request message at sequence 1130 contains the FEC information similarly to the label allocation message at sequence 1131. The label allocation request message at sequence 1130 is transmitted to the destination indicated by the identifier for the eNB 102-1 transmitted at sequence 1116. As a result, the label allocation request message at sequence 1130 is transferred along the packet transfer route corresponding to the GTP tunnel from the S-GW 104 to the eNB 102-1.

The LSR1 (109-1) is positioned along the route corresponding to the GTP tunnel between the S-GW 104 and the eNB 102-1. The LSR1 (109-1) does not transfer the received label allocation request message to further LSR1 (109-1) or the eNB 102-1 if the FEC contained in the received label allocation request message is already stored in the memory 902 or is equal to the FEC contained in the received label allocation message.

The LSR1 (109-1), positioned along the route corresponding to the GTP tunnel from the S-GW 104 to the eNB 102-1, transfers the label allocation message transmitted from the eNB 102-1 at sequence 1131 and transmits it to the S-GW 104 (1132). As a result, the MPLS label containing the FEC information is distributed to the LSR1 (109-1) along the route corresponding to the GTP tunnel from the S-GW 104 to the eNB 102-1 to establish a downstream MPLS path 1133 from the S-GW 104 to the eNB 102-1.

The session establishment response at sequence 1109 might contain the flag indicating allocation of an MPLS path to upstream communication from the UE 101 or the bearer requested for connection. In this case, the S-GW 104 transmits the label allocation message to the LSR1 (109-1) so as to be transmitted to the eNB 102-1 (1135). As a result, the S-GW 104 distributes the MPLS label corresponding to the upstream GTP tunnel allocated at sequences 1110 and 1111 to the LSR1 (109-1) along the route corresponding to the GTP tunnel between the eNB 102-1 and the S-GW 104.

The label allocation request message at sequence 1135 is transmitted to the destination indicated by the identifier for the eNB 102-1 transmitted at sequence 1116. As a result, the label allocation request message at sequence 1135 is transferred along the route corresponding to the GTP tunnel from the eNB 102-1 to the S-GW 104.

Similarly to sequence 1131, the label allocation message at sequence 1135 contains the FEC information for making correspondence between the MPLS path and the GTP tunnel. The FEC information contains the IP address of the S-GW 104 and the TEID for identifying the GTP tunnel from the eNB 102-1 to the S-GW 104.

The FEC information contained in the label allocation message at sequence 1131 may further contain: an identifier indicating the APN used for the UE 101 to communicate with the service network 107; IP addresses of the P-GW 105 and the UE 101; or an identifier such as a bearer ID uniquely indicating the UE 101 or the bearer.

The eNB 102-1 may transmit a label allocation request message to the LSR1 (109-1) parallel to sequence 1135 in order to request the LSR1 (109-1) to allocate an MPLS path (1134). The S-GW 104 can fast allocate the MPLS path by transmitting the label allocation request message.

The label allocation request message at sequence 1134 contains the FEC information similarly to the label allocation message at sequence 1135. The label allocation request message at sequence 1134 is transmitted to the destination indicated by the identifier for the eNB 102-1. As a result, the label allocation request message at sequence 1134 is transferred along the route corresponding to the GTP tunnel from the eNB 102-1 to the S-GW 104.

The LSR1 (109-1) is positioned along the route corresponding to the GTP tunnel between the eNB 102-1 and the S-GW 104. The LSR1 (109-1) does not transfer the received label allocation request message to further LSR1 (109-1) or the S-GW 104 if the FEC contained in the received label allocation request message is already stored in the memory 902 or is equal to the FEC contained in the received label allocation message.

The LSR1 (109-1), positioned along the route corresponding to the GTP tunnel from the eNB 102-1 to the S-GW 104, transfers the label allocation message transmitted from the S-GW 104 at sequence 1135 and transmits it to the eNB 102-1 (1136). As a result, the MPLS label containing the FEC information is distributed to the LSR1 (109-1) along the route corresponding to the GTP tunnel from the eNB 102-1 to the S-GW 104 to establish an upstream MPLS path 1137 from the eNB 102-1 to the S-GW 104.

Sequences 1120 to 1122 and sequences 1124 to 1126 allocate an MPLS path between the S-GW 104 and the P-GW 105 and may be performed parallel to sequences 1110 to 1117 that allocate a GTP tunnel between the eNB 102-1 and the S-GW 104. This can fast allocate the MPLS path.

The GTP tunnel is included in the IP tunnel. According to the embodiment, application of the MPLS to a GTP tunnel is synonymous with application of the MPLS to an IP tunnel. If the embodiment applies the MPLS to the IP tunnel, the TEID is replaced by the identifier that uniquely indicates the IP tunnel.

Figures 7, 8:
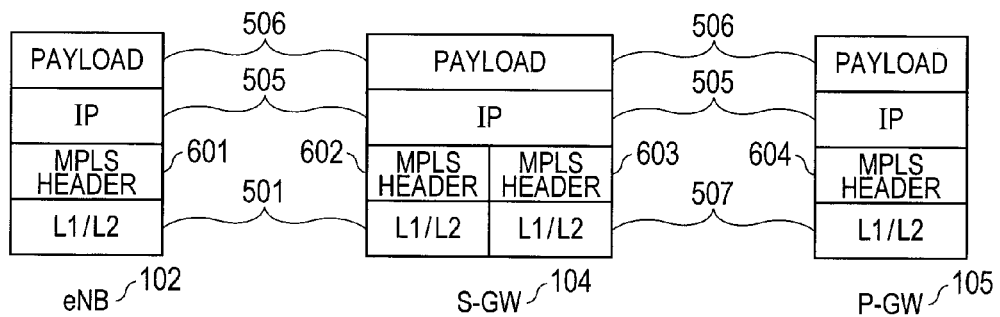
FIG. 7 is an explanatory diagram showing protocol stacks for eNB, S-GW, and P-GW according to the first embodiment of the invention.
FIG. 8 is an explanatory diagram showing an FIB for the MPLS according to the first embodiment of the invention.

FIG. 7 is an explanatory diagram showing protocol stacks for the eNB 102, the S-GW 104, and the P-GW 105 according to the first embodiment of the invention.

FIG. 7 shows protocol stacks available when an MPLS path is established. The protocol stacks shown in FIG. 7 correspond to headers attached to packets that are transmitted and received.

The IP 505 and the payload 506 are equal to those shown in FIG. 3 and correspond to the IP header and the payload attached to a packet transmitted or received from the UE 101. L1/L2 (501) and L1/L2 (507) indicate the physical layer and the data link layer (Layer1/Layer2). The L1/L2 (501) is used between the eNB 102 and the S-GW 104. The L1/L2 (507) is used between the S-GW 104 and the P-GW 105.

An MPLS 601 is equivalent to the MPLS header attached to a packet exchanged between the eNB 102-1 and the LSR1 (109-1). An MPLS 602 is equivalent to the MPLS header attached to a packet exchanged between the LSR1 (109-1) and the S-GW 104.

An MPLS 603 is equivalent to the MPLS header attached to a packet exchanged between the S-GW 104 and the LSR2 (109-2). An MPLS 604 is equivalent to the MPLS header attached to a packet exchanged between the LSR2 (109-2) and the P-GW 105.

The LSR 109 and the S-GW 104 replace headers corresponding to the MPLS's 601 through 604 with labels. That is, the LSR 109 and the S-GW 104 replace the contents of the headers corresponding to the MPLS's 601 through 604 attached to a packet with the labels distributed by the label allocation message and the label allocation request message at sequences 1121, 1122, 1125, 1126, 1131, 1132, 1135, and 1136. As a result, the packet is transferred within the radio access network 108.

For example, a packet might store an identifier (a value equivalent to the TEID) for each IP tunnel in each of the MPLS headers corresponding to the MPLS's 601 through 604. In such a case, each LSR 109 and the S-GW 104 can compare an FEC type 703 and an FEC value 704 maintained in themselves with the IP tunnel identifier contained in the packet and determine which MPLS path the packet passes through.

FIG. 8 is an explanatory diagram showing an FIB for the MPLS according to the first embodiment of the invention.

FIG. 8 exemplifies an MPLS FIB (Forwarding Information Base) maintained in the LSR 109 or the S-GW 104. The FIB contains an input port 701, an input label 702, an FEC type 703, an FEC value 704, an output port 705, and an output label 706.

The input port 701 indicates a reception port corresponding to the MPLS path. The input label 702 indicates a reception label corresponding to the MPLS path.

The FEC type 703 indicates the attribute of a packet accommodated to the MPLS path. That is, the FEC type 703 indicates what type of UE 101 or bearer transmitted the packet. The type includes an identifier that uniquely indicates the UE 101 or the bearer.

For example, the FEC type 703 stores: the address indicated by IPv4 or IPv6; the subnet indicated by IPv4 or IPv6; the IP address of an apparatus as a reception endpoint of the GTP tunnel and the TEID of the GTP tunnel; the IP address of the UE 101 and the address of P-GW or HA (Home Agent); the IP address of the UE 101 and the identifier of a service network such as APN used by the UE 101; and the identifier such as IMSI (International Mobile Subscriber Identity) and/or a bearer ID.

The FEC value 704 stores a value corresponding to the FEC type 703. That is, the FEC value 704 stores a value for the identifier indicated by the FEC type 703. One MPLS FIB may maintain plural FEC types 703 and FEC values 704.

The FEC type 703 and the FEC value 704 store the FEC information contained in the label allocation message and the label allocation request message at sequences 1121, 1122, 1125, 1126, 1131, 1132, 1135, and 1136.

The output port 705 indicates an output port corresponding to the MPLS path. The output label 706 indicates an output label corresponding to the MPLS path. The MPLS FIB in FIG. 8 may store predetermined values or dynamically store values in accordance with the MPLS label allocation signaling in FIG. 6 (including the label allocation message and the label allocation request message shown in FIG. 6).

The LSR 109 receives a packet and then references the MPLS FIB maintained in itself. The LSR 109 determines whether the FIB contains entries for the input port 701 and the input label 702 that match the input port for the received packet and the MPLS label maintained in the received packet. If the FIB contains matching entries, the LSR 109 replaces the MPLS label maintained in the packet with the output label 706 for the matching entry. The LSR 109 transmits the packet from the interface 904 for a port specified by the output port 705.

Figure 9:
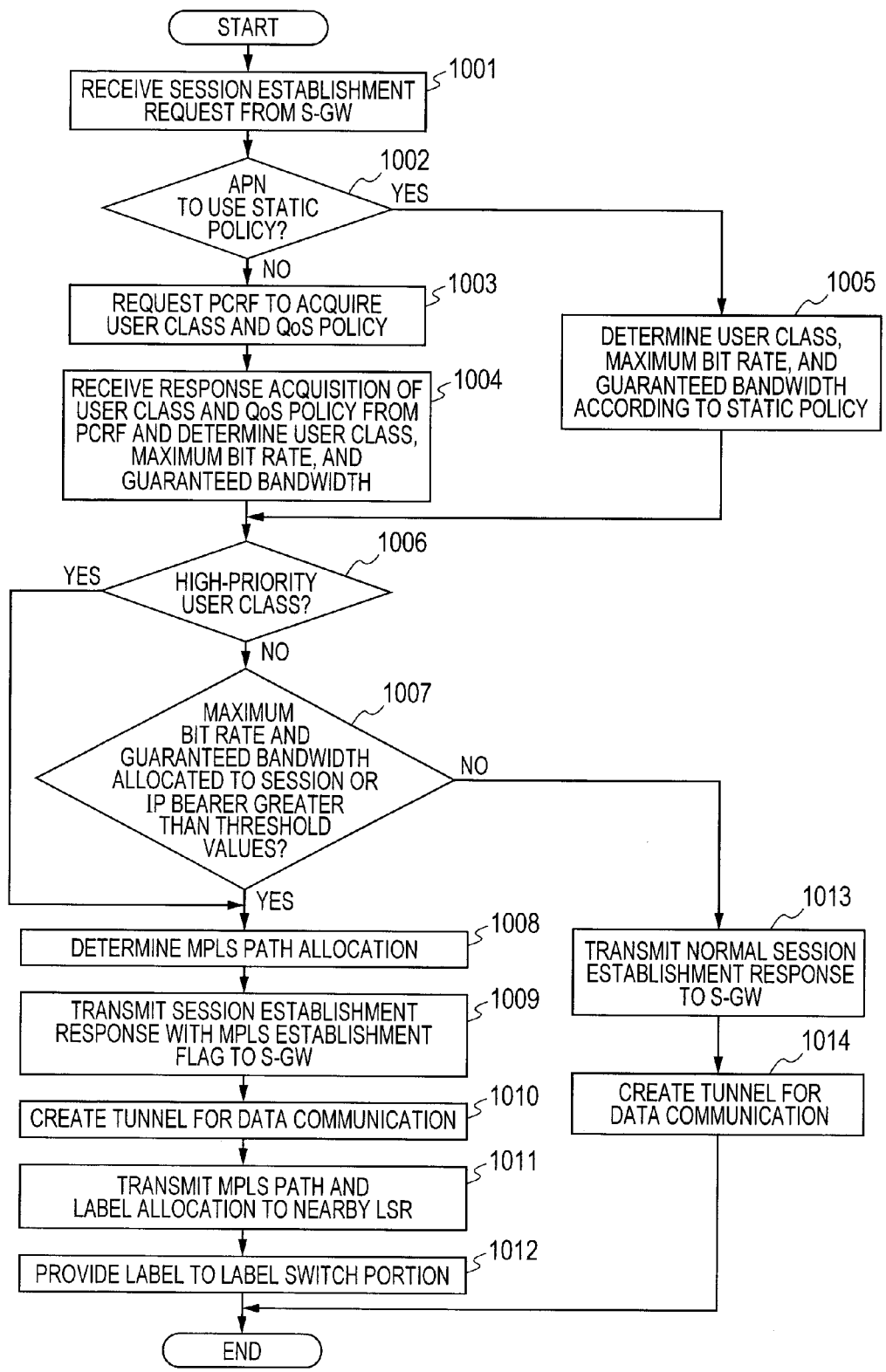
FIG. 9 is a flowchart showing a P-GW process after reception of a session establishment request according to the first embodiment of the invention.

FIG. 9 is a flowchart showing a process of the P-GW 105 after reception of a session establishment request according to the first embodiment of the invention.

The P-GW 105 receives a session establishment response from the S-GW 104 at sequence 1108 (1001). The P-GW 105 then determines whether the static policy previously stored in the P-GW 105 is used for the service network corresponding to the APN used by the UE 101 or the bearer requested for connection via the eNB 102-1, the MME 103, and the S-GW 104 (1002).

The static policy previously stored in the P-GW 105 might not be used for the service network corresponding to the APN used by the UE 101 or the bearer requested for connection. In this case, the P-GW 105 requests the PCRF 120 to transmit the user class and/or the QoS policy of the UE 101 or the bearer requested for connection (1003).

After step 1003, the P-GW 105 receives the user class and/or the QoS policy from the PCRF 120. The P-GW 105 settles the maximum bit rate and/or the guaranteed bandwidth of the UE 101 or the bearer requested for connection based on the received user class and/or QoS policy (1004).

At step 1002, the static policy previously stored in the P-GW 105 might be used for the service network corresponding to the APN used by the UE 101. In this case, the P-GW 105 extracts the user class and/or the QoS policy stored in the P-GW 105. The P-GW 105 settles the maximum bit rate and/or the guaranteed bandwidth of the UE 101 or the bearer requested for connection based on the extracted user class and/or QoS policy (1005).

After step 1004 or 1005, the P-GW 105 determines whether the user class acquired at step 1003 or 1005 indicates a high priority (1006). If the user class indicates a high priority, the P-GW 105 proceeds to step 1008 to allocate an MPLS path based on the user class.

At step 1006, the user class acquired at step 1003 or 1005 might not indicate a high priority. In this case, the P-GW 105 determines whether the maximum bit rate and/or the guaranteed bandwidth settled at step 1004 or 1005 is greater than a threshold value previously maintained in the P-GW 105 (1007). The P-GW 105 thereby determines whether to allocate an MPLS path to the UE 101 or the bearer requested for connection.

At step 1007, the settled maximum bit rate and/or guaranteed bandwidth might be smaller than or equal to the threshold value previously maintained in the P-GW 105. In this case, the P-GW 105 determines not to allocate an MPLS path to the UE 101 or the bearer requested for connection because high QoS is unneeded for the UE 101 or the bearer requested for connection. The P-GW 105 then transmits a normal session establishment response to the S-GW 104 (1013). This is equivalent to sequence 1409 in FIG. 2.

After step 1013, the UE 101, the eNB 102, the MME 103, and the S-GW 104 establish an IP tunnel for data communication (1014). This is equivalent to sequences 1410 to 1417 in FIG. 2.

At step 1007, the settled maximum bit rate and/or guaranteed bandwidth might be greater than the threshold value previously maintained in the P-GW 105. In this case, the P-GW 105 determines to allocate an MPLS path to the UE 101 or the bearer requested for connection because high QoS is needed for the UE 101 or the bearer requested for connection (1008). The P-GW 105 transmits a session establishment response supplied with the flag for MPLS path establishment to the S-GW 104 (1009). This is equivalent to sequence 1109 in FIG. 6.

After step 1009, the UE 101, the eNB 102-1, the MME 103, and the S-GW 104 generate an IP tunnel for data communication (1010). This is equivalent to sequences 1110 to 1117 in FIG. 6. After step 1010, the eNB 102-1, the S-GW 104, and the P-GW 105 transmit an MPLS path, a label allocation message, and a label allocation request message to the LSR 109 connected to themselves (1011). After step 1011, each LSR 109 stores the label in the label switch processing portion 905 (1012).

As mentioned above, the MPLS path allocation is determined in accordance with the UE 101 or the bearer. The MPLS path allocation may be determined in accordance with the upstream or downstream communication for the UE 101 or the bearer if the static policy previously maintained in the P-GW 105 or the QoS policy maintained in the PCRF 120 is settled for the upstream or downstream communication.

The first embodiment can uniquely settle a route between the eNB 102 and the P-GW 105 by allocating an MPLS path between endpoints of the IP tunnel. The MPLS label is not distributed to unnecessary LSR 109.

The MPLS path is allocated to the route for each UE 101 or bearer accommodated to the IP tunnel. It is therefore possible to prevent degradation of the MPLS network performance and insufficiency of resources due to distribution of many label switch paths to all the LSRs 109 in the radio access network 108.

The QoS policy is acquired for each UE 101 or bearer. It is therefore possible to determine the UE 101 or bearer requiring an MPLS path and efficiently apply the MPLS.

Second Embodiment

The following describes hand-over operations of the UE 101 according to the second embodiment of the invention.

Figure 10:
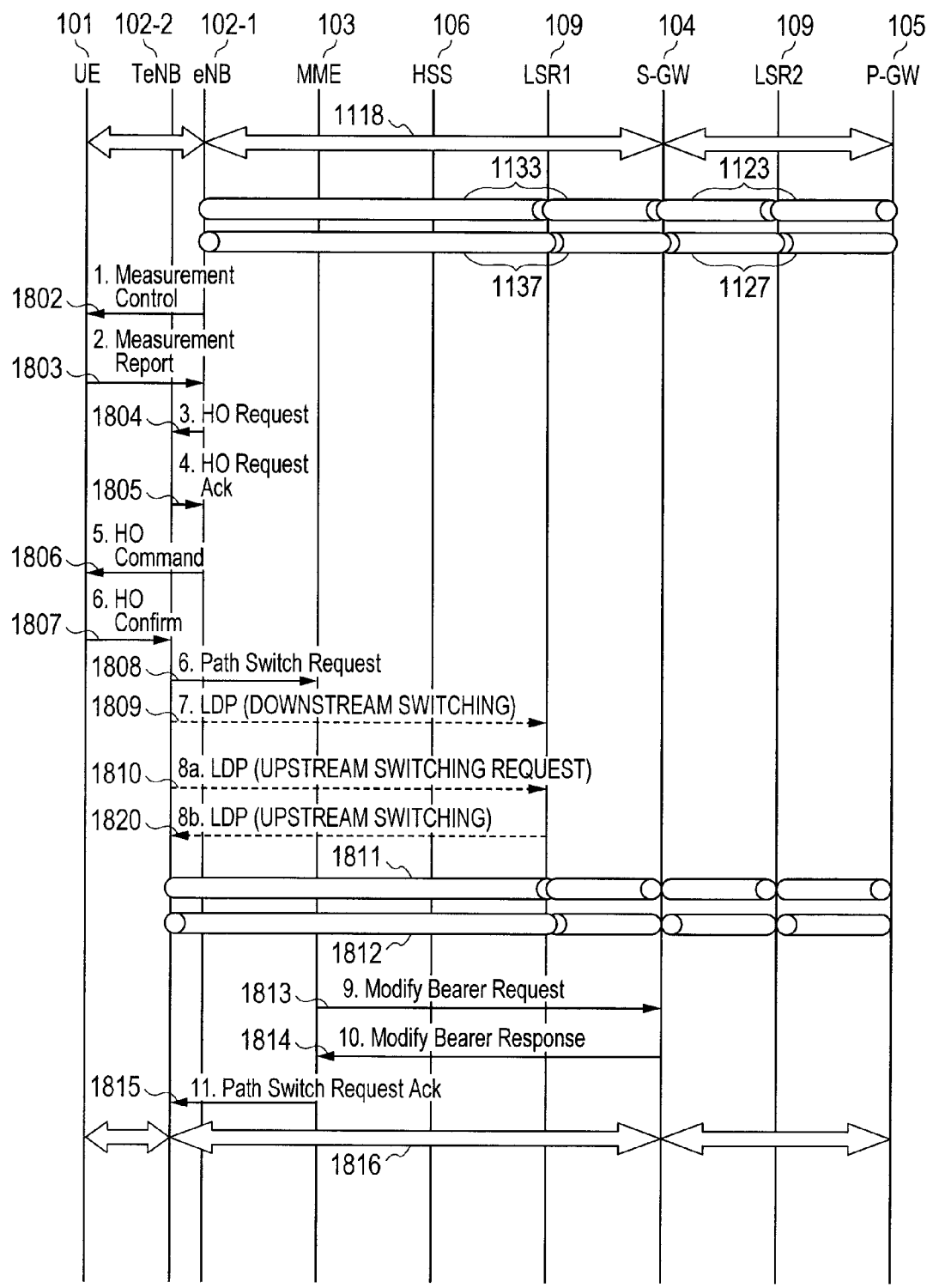
FIG. 10 is a sequence diagram showing a UE hand-over process according to a second embodiment of the invention.

FIG. 10 is a sequence diagram showing a hand-over process of the UE 101 according to the second embodiment of the invention.

The sequence diagram in FIG. 10 shows a process after completion of the process from sequences 1101 to 1136 in FIG. 6. In FIG. 10, the eNB 102-1 represents a base station as a hand-over origin. The TeNB 102-2 represents the eNB 102 as a hand-over destination. The eNB 102-1 at the beginning of the sequence in FIG. 10 is equivalent to the eNB 102-1 after the process in FIG. 6 has been performed up to sequence 1136.

MPLS paths before hand-over (HO) include 1133, 1123, 1137, and 1127. The eNB 102-1 as an HO origin transmits a Measurement Control message to the UE 101 and thereby requests the UE 101 to report a radio state at the transmission of the Measurement Control message and information indicating the eNB 102 from which the UE 101 receives signals (1802).

After sequence 1802, the UE 101 transmits a Measurement Report message to notify the eNB 102-1 of the radio state at the reception of the Measurement Control and the information about the eNB 102 from which the LTE 101 receives signals (1803). The information about the eNB 102 includes information such as the radio field strength of a signal the UE 101 receives from the eNB 102, position information about the UE 101, and/or a distance from the nearest eNB 102.

The eNB 102-1 as the HO origin settles the TeNB 102-2 as an HO destination based on the received Measurement Report message. The eNB 102-1 transmits an HO Request message to the TeNB 102-2 in order to request the settled TeNB 102-2 as the HO destination to prepare for HO (1804).

The HO Request message contains information about a bearer with which the eNB 102-1 as the HO origin and the UE 101 are communicating. The information about the communicating bearer includes, for example, an identifier for uniquely identifying the UE 101 allocated by the MME 103, an identifier specific to the UE 101, a bearer ID corresponding to each bearer, information about an IP tunnel corresponding to the bearer, and information indicating whether an MPLS path is used for the IP tunnel.

After sequence 1804, the TeNB 102-2 as the HO destination transmits an HO Request Ack message to the eNB 102-1 to notify completion of the HO preparation, if done (1805). The eNB 102-1 as the HO origin receives the HO Request Ack message and then transmits an HO Command message to the UE 101 in order to perform the HO (1806).

After sequence 1806, the UE 101 is assumed to successfully establish a radio link to the TeNB 102-2 as the HO destination and then transmits an HO Confirm message to the TeNB 102-2 (1807). The TeNB 102-2 receives the HO Confirm message and then notifies the MME 103 of successful HO and requests it to switch the IP tunnel (1808).

After sequence 1808, the MME 103 transmits a Modify Bearer Request message to the S-GW 104 to notify that the HO occurs between the UE 101 and the eNB 102 and the IP tunnel needs to be switched (1813).

The S-GW 104 receives the Modify Bearer Request message and then returns the Modify Bearer Response message to respond to the MME 103 (1814).

The MME 103 receives the Modify Bearer Response message and then transmits a Path Switch Ack message to notify the TeNB 102-2 as the HO destination that the IP tunnel has been switched successfully (1815). As a result, an IP tunnel 1816 is established.

The TeNB 102-2 as the HO destination starts switching the MPLS path simultaneously with the IP tunnel switching process (equivalent to sequences 1813 to 1815). According to the second embodiment, the MPLS path switching during HO is not performed on all the LSR1s (109-1) that are travelled from the TeNB 102-2 to the S-GW 104 as endpoints of the IP tunnel. The MPLS path switching just needs to be performed only on the LSR1 (109-1) between the TeNB 102-2 and the LSR1 (109-1) as a junction (branch point) between the earlier MPLS and the new MPLS path. This makes it possible to reduce the time needed to switch the MPLS path.

The TeNB 102-2 as the HO destination transmits a label distribution message to the directly connected LSR1 (109-1) (1809). The label distribution message is addresses to the S-GW 104 and switches the downstream MPLS path from the S-GW 104 to the TeNB 102-2. An LDP signal is used to transmit the label distribution message to the LSR1 (109-1).

The label distribution message at sequence 1809 stores the information contained in the HO Request message at sequence 1804. In order to switch the MPLS path, the label distribution message stores the identifier allocated by the MME 103 for identifying the UE 101, the identifier specific to the UE 101, the bearer ID, and the destination address of the MPLS path (i.e., the address of the S-GW 104 as an endpoint of the IP tunnel).

The TeNB 102-2 as the HO destination also transmits a label distribution request message to the directly connected LSR1 (109-1) (1810). The label distribution request message is addresses to the S-GW 104 and switches the upstream MPLS path from the TeNB 102-2 to the S-GW 104. An LDP signal is used to transmit the label distribution request message to the LSR1 (109-1).

Similarly to the label distribution message at sequence 1809, the label distribution request message at sequence 1810 stores the information contained in the HO Request message at sequence 1804. In order to switch the MPLS path, the label distribution request message stores the identifier allocated by the MME 103 for identifying the UE 101, the identifier specific to the UE 101, the bearer ID, and the destination address of the MPLS path (i.e., the address of the S-GW 104 as an endpoint of the IP tunnel).

The label distribution message at sequence 1809 and the label distribution request message at sequence 1810 are transmitted to the LSR1 (109-1) along the route from the TeNB 102-2 to the S-GW 104. These messages are received and processed in the LSR1s (109-1) and then are transmitted to the next LSR1 (109-1) along the route to the S-GW 104.

Each LSR1 (109-1) receives the label distribution message at sequence 1809 and the label distribution request message at sequence 1810 and then searches the MPLS FIB (see FIG. 8) maintained in itself. The LSR1 (109-1) determines whether its FIB contains information that matches the information contained in the label distribution message and the label distribution request message.

If containing matching information, the LSR1 (109-1) is to be used as a junction (branch point) and therefore stops further transfer of the label distribution message and the label distribution message. The LSR1 (109-1) updates the MPLS FIB (see FIG. 8) maintained in itself based on the information contained in the received label distribution message and label distribution request message.

Specifically, the LSR1 (109-1) receives the label distribution message at sequence 1809 and then extracts entries for the FEC type 703 and the FEC value 704 corresponding to identifiers contained in the label distribution message from the FIB maintained in the LSR1 itself. The LSR1 (109-1) updates the input port 701 and the input label 702 for the extracted entries to values corresponding to those contained in the label distribution message.

The LSR1 (109-1) receives the label distribution request message at sequence 1810 and then extracts entries for the FEC type 703 and the FEC value 704 corresponding to identifiers contained in the label distribution request message from the FIB maintained in the LSR1 itself. The LSR1 (109-1) updates the output port 705 and the output label 706 for the extracted entries to a port and a label corresponding to the new MPLS path. The LSR1 (109-1) stores the updated label in the label distribution request message. The LSR1 (109-1) then transfers the label distribution request message to the next LSR1 (109-1) along the route to have transmitted the label distribution request message toward the transmission origin (i.e., TeNB 102-2) of the message.

Sequence 1809 establishes the downstream MPLS path 1811. Sequences 1810 and 1820 establish the upstream MPLS path 1812.

The MPLS path presetting (equivalent to sequence 1809) may start when the TeNB 102-2 receives the HO Request message (equivalent to sequence 1804) for allowing the TeNB 102-2 to prepare for HO in the MPLS path switching procedure. In this case, the TeNB 102-2 may receive the HO Confirm message indicating the completion of HO from the UE 101 (equivalent to sequence 1807) and then may command the LSR1 (109-1) as a junction (branch point) to completely switch the MPLS path.

Figure 11:
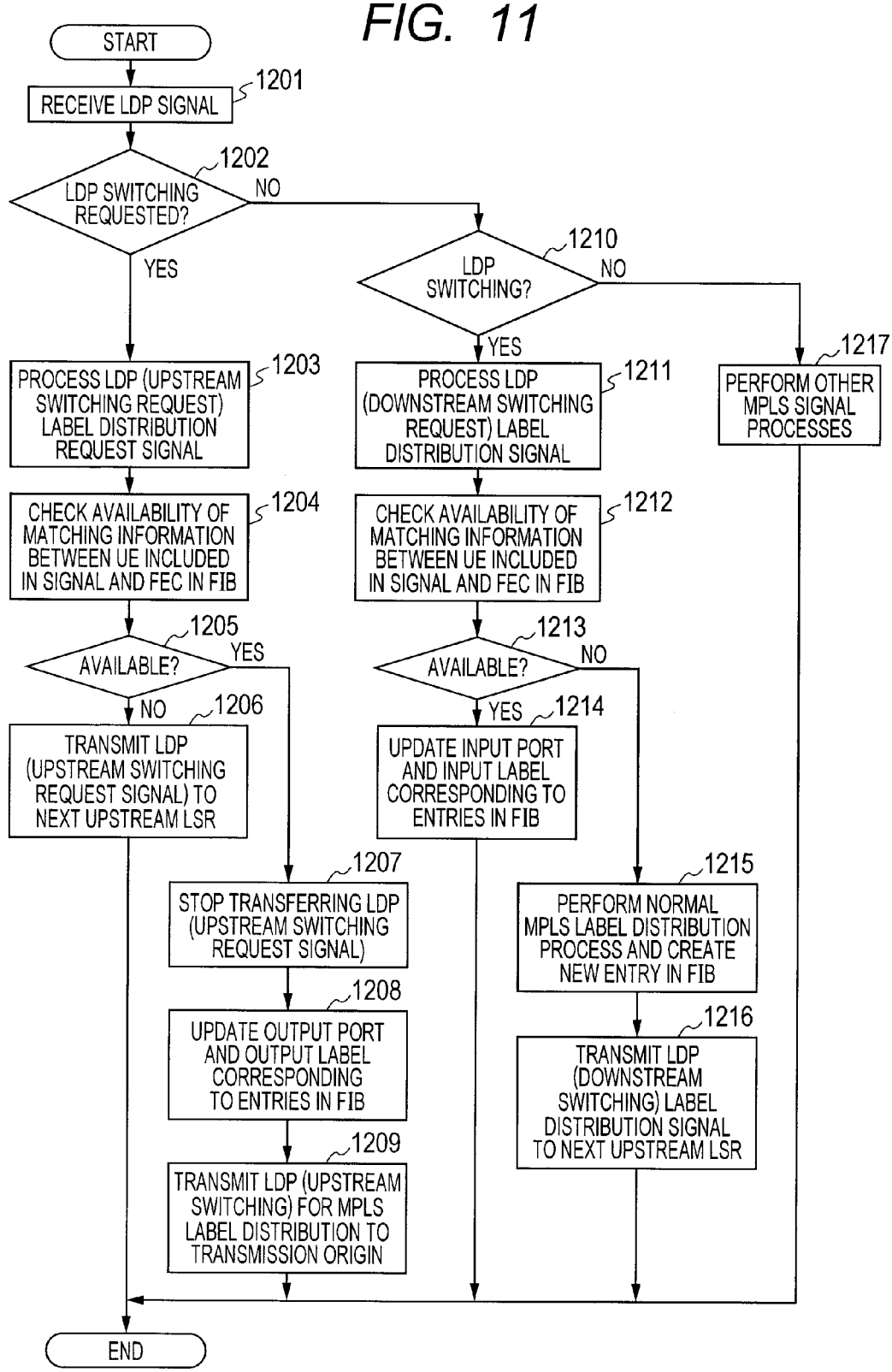
FIG. 11 is a flowchart showing an LSR process during hand-over according to the second embodiment of the invention.

FIG. 11 is a flowchart showing a process of the LSR 109 during hand-over according to the second embodiment of the invention.

The LSR1 (109-1) receives an LDP signal and then starts the process in FIG. 11 (1201). After step 1201, the LSR1 (109-1) analyzes the received LDP signal and determines whether the LDP signal indicates downstream switching, that is, the LDP signal contains the label distribution message (1202).

If the received LDP signal contains the label distribution request message, the LSR1 (109-1) determines to allow the received LDP signal to perform the process at step 1203 and later (1203). The LSR1 (109-1) determines whether the FEC type 703 and the FEC value 704 in its FIB store the same value as information contained in the label distribution request message (1204 and 1205).

The LSR1 (109-1) is not defined as a junction (branch point) if its FIB does not store the same value as information contained in the label distribution request message. The LSR1 (109-1) transmits the label distribution request message (upstream switch request) to the next LSR1 (109-1) between the TeNB 102-2 and the S-GW 104 (1206).

The LSR1 (109-1) is defined as a junction (branch point) if its FIB stores the same value as information contained in the label distribution request message. If the HO changes the MPLS path, the LSR1 (109-1) between another LSR1 (109-1) as a junction and the S-GW 104 need not update the already stored MPLS label corresponding to the UE 101.

At step 1205, the LSR1 (109-1) might find that its FIB stores the same value as information contained in the label distribution request message. In this case, the LSR1 (109-1) stops transmitting the LDP signal (label distribution request message) to the next LSR1 (109-1) along the route to the S-GW 104 (1207).

After step 1207, the LSR1 (109-1) extracts an FIB entry matching the information contained in the label distribution request message. The LSR1 (109-1) updates the extracted FIB entries corresponding to the output port 705 and the output label 706 to equivalents the LSR1 (109-1) allocated for the changed path (1208). After step 1208, the LSR1 (109-1) uses an LDP (upstream switching) signal to transmit a label distribution message containing the changed label to the transmission origin of the LDP switch request (label distribution request message) (1209).

After step 1209, the LSR1 (109-1) between another LSR1 (109-1) as a junction and the TeNB 102-2 might receive the LDP (upstream switching) signal and then updates its FIB based on the received FEC information and the output port and the output label the relevant LSR1 (109-1) allocated for the changed path. That LSR1 (109-1) then transmits a response to the transmission origin of the LDP switch request (label distribution request message).

In this manner, the TeNB 102-2 distributes the MPLS label for the newly allocated upstream MPLS path to the LSR1 (109-1) between the TeNB 102-2 and the LSR1 (109-1) as a junction (branch point). As a result, the upstream MPLS path 1812 is established.

At step 1202, the LSR1 (109-1) might receive an LDP signal that does not contain the label distribution request message. In this case, the LSR1 (109-1) determines whether the received LDP signal requests downstream switching, that is, whether the LDP signal contains the label distribution message (1210).

If the received LDP signal contains the label distribution message, the LSR1 (109-1) determines to allow the received LDP signal to perform the process at 1211 and later (1211). The LSR1 (109-1) determines whether the FEC type 703 and the FEC value 704 in its FIB store the same value as information contained in the label distribution message (1212 and 1213).

The LSR1 (109-1) is defined as a junction (branch point) if its FIB stores the same value as information contained in the label distribution request message. At step 1213, the LSR1 (109-1) might be determined that its FIB stores the same value as information contained in the label distribution request message. In this case, the LSR1 (109-1) then stops transmitting the LDP signal to the next LSR1 (109-1) along the route to the S-GW 104.

The LSR1 (109-1) extracts an FIB entry matching the information contained in the label distribution message. The LSR1 (109-1) updates the input port 701 and the input label 702 corresponding to the extracted FIB entries to the information contained in the received label distribution message (1214).

At step 1213, the LSR1 (109-1) might be determined that its FIB does not store the same value as information contained in the label distribution request message. In this case, the LSR1 (109-1) configures a new MPLS path. That is, the LSR1 (109-1) creates a new entry in the FIB and stores a value corresponding to the downstream MPLS path in the new entry (1215).

Specifically, at step 1215, the LSR1 (109-1) stores values contained in the label distribution message in the FEC type 703 and the FEC value 704 as new entries. The values include the identifier allocated by the MME 103 for identifying the UE 101, the identifier specific to the UE 101, the bearer ID corresponding to each bearer, and the destination address of the MPLS path (i.e., the address of the S-GW 104 as an endpoint of the IP tunnel).

After step 1215, the LSR1 (109-1) transmits an LDP signal containing the label distribution message to the next LSR1 (109-1) along the route to the S-GW104 (1216).

The process at steps 1211 to 1216 establishes the downstream MPLS path 1811 from the LSR1 (109-1) as a junction to the TeNB 102-2.

At step 1210, the LDP signal might contain neither the label distribution message nor the label distribution request message. In this case, the LSR1 (109-1) performs the other MPLS signal processes (1217).

The first and second embodiments are available with the same UE 101, eNB 102, MME 103, S-GW 104, P-GW 105, LSR 109, and PCRF 120.

The embodiment has allocated the MPLS path in accordance with the IP tunnel establishment procedure. In addition, the embodiment can establish the MPLS path according to the same procedure as that shown in FIG. 6 if the transitional apparatus (equivalent to S-GW 104) between the P-GW 105 and the eNB 102 is uniquely determined and a route between the eNB 102 and the transitional apparatus and a route between the transitional apparatus and the P-GW 105 are uniquely determined for the UE 101 or the bearer separately from each other.

During hand-over, the second embodiment switches the MPLS path on the route from the eNB 102 to the S-GW 104. This eliminates the need to distribute an MPLS label to the LSR109 that is included in the route from the eNB 102 to the P-GW 105 and need not switch the MPLS path. The MPLS network can be operated efficiently.

The embodiment extracts the LSR1 (109-1) that is included between the eNB 102 and the S-GW 104 and is assumed to be a junction between the route before hand-over and the route after hand-over. The embodiment updates the MPLS path between the extracted LSR1 (109-1) as a junction and the eNB 102. This makes it possible to fast update the MPLS path during hand-over and efficiently operate the mobile MPLS network.

In general, the eNB 102 connected to the UE 101 before hand-over is positioned geographically near the eNB 102 connected to the UE 101 after hand-over. In many cases, a route connecting the eNB 102 to the S-GW 104 before hand-over share many LSR1s (109-1) with a route connecting the eNB 102 to the S-GW 104 after hand-over. Therefore, it is possible to highly efficiently operate the mobile MPLS network by switching the MPLS path due to hand-over up to the LSR1 (109-1) functioning as a junction.

The embodiment can uniquely settle a route to which the MPLS is allocated. This makes it possible to decrease the network performance degradation due to MPLS label distribution. The embodiment fast switches an MPLS label for the LSR 109 between the eNB 102 and the P-GW 105 or the S-GW 104. This makes it possible to fast complete the hand-over and highly efficiently operate the mobile MPLS network.

What is claimed is:

1. A network system comprising:
a plurality of mobile terminals;
a plurality of base stations connected to the mobile terminals by radio;
a first gateway connected to the base stations via a plurality of first network apparatuses;
a second gateway connected to the first gateway via a plurality of second network apparatuses; and
a management server connected to the base stations and the first gateway,
wherein a first of the mobile terminals is connected to a first of the base stations and the first base station transmits a request for connection with the first mobile terminal to the management server;

wherein the first gateway thereafter receives a first signal from the management server, the first signal being configured to include a request for connection between the first mobile terminal and the second gateway, an identifier of the second gateway, and an identifier of the first mobile terminal;

wherein the first gateway transmits a second signal to a destination specified by the identifier of the second gateway included in the first signal, the second signal being configured to include the identifier of the first mobile terminal included in the first signal and an identifier of the first gateway;

wherein the second gateway transmits a third signal to a destination specified by the identifier of the first gateway included in the second signal, the third signal being configured to include the identifier of the second gateway and an MPLS allocation flag indicating allocation of an MPLS path to a route between the first mobile terminal and the second gateway;

wherein, based on the MPLS allocation flag included in the third signal, the first gateway transmits a fourth signal for MPLS path allocation to a destination specified by the second gateway included in the third signal via the second network apparatuses, the fourth signal being configured to include the identifier of the first mobile terminal;

wherein the first base station receives a fifth signal from the first gateway via the management server, the fifth signal being configured to include the identifier of the first gateway and the MPLS allocation flag;

wherein, based on the MPLS allocation flag included in the fifth signal, the first base station transmits a sixth signal for MPLS path allocation to a destination specified by the identifier of the first gateway included in the fifth signal via the first network apparatuses, the sixth signal being configured to include the identifier of the first mobile terminal; and wherein, after the first mobile terminal is connected to the second base station, the second base station transmits a seventh signal for MPLS allocation to a plurality of third network apparatuses provided to a route for communication between the second base station and the first gateway, the seventh signal being configured to include the identifier of the first mobile terminal.

2. The network system according to claim 1,
wherein the first mobile terminal uses a plurality of bearers for communication;
wherein the identifier of the first mobile terminal includes identifiers of the bearers;
wherein the first network apparatus is provided to a route that includes the first base station and the first gateway as endpoints and uses a first IP tunnel corresponding to the bearers; and
wherein the second network apparatus is provided to a route that includes the first gateway and the second gateway as endpoints and uses a second IP tunnel corresponding to the bearers.

3. The network system according to claim 1,
wherein the second gateway acquires QoS policy applied to a signal transmitted from the first mobile terminal based on the identifier of the first mobile terminal included in the second signal; and
wherein, when the acquired QoS policy is higher than a specified threshold value, the second gateway transmits the identifier of the second gateway and the MPLS allocation flag to a destination specified by the identifier of the first gateway included in the second signal.

4. The network system according to claim 1,
wherein the first network apparatus and the second network apparatus extract the identifier of the first mobile terminal included in the fourth signal and the sixth signal; and
wherein the first network apparatus and the second network apparatus maintain the extracted identifier of the first mobile terminal.

5. The network system according to claim 4,
wherein the third network apparatuses extract the identifier of the first mobile terminal included in the seventh signal;
wherein the third network apparatus does not transmit the seventh signal to the first gateway when the third network apparatus already maintains the extracted identifier of the first mobile terminal and the seventh signal allocates an MPLS path for downstream communication; and
wherein the third network apparatus transmits the seventh signal to the second base station, not to the first gateway, when the third network apparatus already maintains the extracted identifier of the first mobile terminal and the seventh signal allocates an MPLS path for upstream communication.

6. The network system according to claim 1,
wherein the first base station transmits the identifier of the first gateway to the second base station after the first mobile terminal is connected to the second base station; and
wherein the second base station transmits the seventh signal to a destination specified by the transmitted identifier of the first gateway via the third network apparatus.

* * * * *